United States Patent
Vaillancourt

(10) Patent No.: US 11,737,425 B1
(45) Date of Patent: Aug. 29, 2023

(54) PET TOY MAT

(71) Applicant: Robin Vaillancourt, Midland (CA)

(72) Inventor: Robin Vaillancourt, Midland (CA)

( * ) Notice: Subject to any disclaimer, the term of this patent is extended or adjusted under 35 U.S.C. 154(b) by 136 days.

(21) Appl. No.: 17/368,364

(22) Filed: Jul. 6, 2021

(51) Int. Cl.
 *A01K 15/02* (2006.01)
 *A01K 1/035* (2006.01)
(52) U.S. Cl.
 CPC .......... *A01K 1/0353* (2013.01); *A01K 15/026* (2013.01)
(58) Field of Classification Search
 CPC .. A01K 15/025; A01K 15/026; A01K 1/0353; A47G 9/0223
 See application file for complete search history.

(56) References Cited

U.S. PATENT DOCUMENTS

| | | | | |
|---|---|---|---|---|
| 2,078,022 A * | 4/1937 | Frank | ...................... | A63F 9/088 5/655 |
| 6,209,134 B1 * | 4/2001 | Schiesel | ................. | A41D 13/04 2/46 |
| 6,378,463 B1 | 4/2002 | Simmons | | |
| 6,684,422 B2 | 2/2004 | LeFevre | | |
| 6,918,355 B1 * | 7/2005 | Arvanites | ............ | A01K 15/026 119/707 |
| 8,381,334 B2 * | 2/2013 | Ballard | .................. | A47G 9/062 5/655 |
| 8,763,181 B1 * | 7/2014 | Penfold | .............. | A47G 23/0306 5/655 |
| 9,089,169 B1 * | 7/2015 | Covo | ........................ | A41D 1/04 |
| 10,098,477 B2 * | 10/2018 | Flynn-Kirkpatrick | ....................... | A47D 15/003 |
| 10,314,419 B2 * | 6/2019 | Archibald | ............ | A47G 33/004 |
| 11,135,526 B1 * | 10/2021 | Fields | ................... | A47F 5/0884 |
| 2002/0095725 A1 * | 7/2002 | Dix | ......................... | A47D 15/00 5/482 |
| 2005/0039261 A1 * | 2/2005 | Corral | ..................... | A47G 9/062 383/4 |
| 2012/0020586 A1 * | 1/2012 | Gilbert | ................ | A47G 27/0243 383/4 |
| 2019/0076745 A1 * | 3/2019 | Sapulich | ................ | A63H 33/006 |
| 2020/0337269 A1 * | 10/2020 | Jeong | ..................... | A01K 15/025 |

\* cited by examiner

*Primary Examiner* — Trinh T Nguyen
(74) *Attorney, Agent, or Firm* — SANCHELIMA & ASSOCIATES, P.A.; Christian Sanchelima; Jesus Sanchelima

(57) ABSTRACT

A pet toy mat including a blanket assembly and an article assembly is disclosed. The blanket assembly includes a blanket having a centrally mounted padding for the comfort of the pet laying thereon. The blanket includes handles and bands on a rear portion. The padding in conjunction with the handles and bands have the added benefit of helping to maintain the blanket in a closed configuration. The padding providing stability while the bands keep the blanket from unfurling. The mounting assembly includes articles that have article loops mounted thereon. Each of the article loops are detachably mounted to a front interior portion of the blanket via clips that engage with mounting loops.

8 Claims, 3 Drawing Sheets

PET TOY MAT

BACKGROUND OF THE INVENTION

1. Field of the Invention

The present invention relates to a pet toy may and, more particularly, to a pet toy mat that includes a blanket having multiple detachable toys.

2. Description of the Related Art

Several designs for a pet toy mat have been designed in the past. None of them, however, include a blanket including a mounting assembly to facilitate removably attaching toys.

Applicant believes that a related reference corresponds to U.S. Pat. No. 6,684,422 issued for an interactive blanket having connection devices to allow for removing and attaching various toys. Applicant believes that another related reference corresponds to U.S. Pat. No. 6,378,463 issued for a pet bed having multiple hanging toy attachments. None of these references, however, teach of a pet toy mat that includes handles to facilitate portability of the present invention.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a pet toy mat that includes a mounting assembly to removably attach toys.

It is another object of this invention to provide a pet toy mat that includes a centrally mounted padding to provide comfort and stability to the blanket.

It is still another object of the present invention to provide a pet toy mat that includes handles and elastic bands mounted thereon to facilitate portability.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
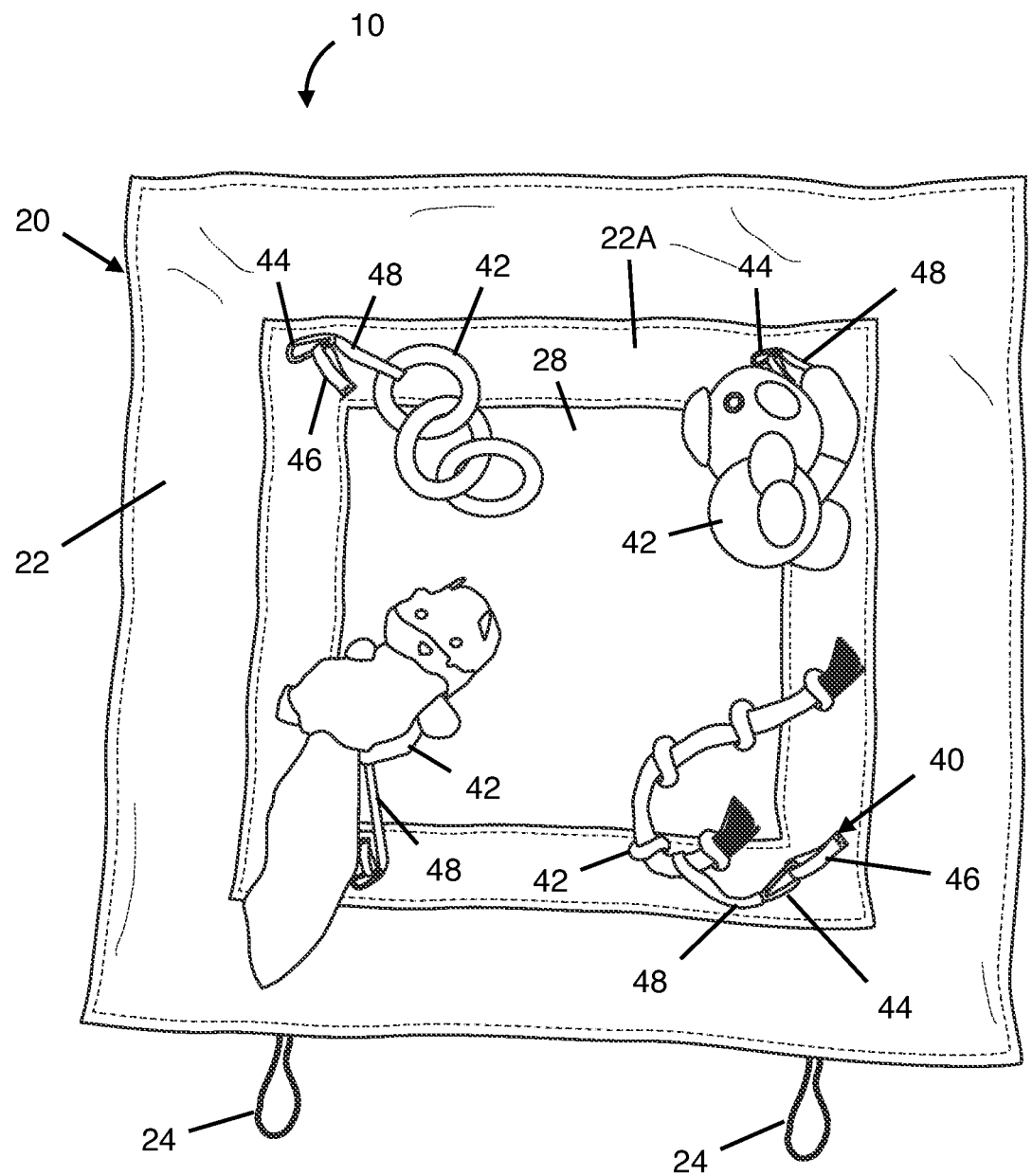
FIG. 1 represents a front view of the blanket 22 of blanket assembly 20 in an unfurled configuration with a centrally located padding 28. The front of the blanket 22 including mounting loops 46 disposed about interior corners. The mounting loops 46 are shown engaging with the article loop 48 of the articles 42 via clips 44.

Referring now to the drawings, where the present invention is generally referred to with numeral 10, it can be observed that it basically includes a blanket assembly 20, and a mounting assembly 40. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

Best illustrated in FIG. 1 blanket assembly 20 may include blanket 22. In one embodiment the blanket 22 may include four perimeter sides. Wherein each of said four perimeter sides includes a stitching to maintain multiple layers, the blanket 22 is comprised of, secured to each other. Located between the multiple layers of the blanket 22 may be a centrally mounted padding 28. The padding 28 may be made of foam, cotton, sponge, or other insulating material. The padding 28 may provide a comfortable place for a pet to lay thereon. The padding 28 may also provide structural stability to the blanket 22 and help maintain said blanket 22 in an unfurled configuration while in use. The padding 28 may be centrally located within the blanket 22 and include four perimeter sides. The blanket assembly 20 may further include an inner frame 22A. The inner frame 22A may be entirely located within the perimeter of the blanket 22. The inner frame 22A may be made of multiple cloth layers that are stitched to each other about an inner perimeter edge and an outer perimeter edge of said inner frame 22A. The inner frame 22A may also be made of canvas or leather material. It may be suitable for the inner frame 22A to be mounted to the blanket 22 via stitching as well. The inner frame 22 may include four perimeter sides that are stitched about the perimeter edge of the padding 28. Thereby helping maintain the padding 28 within a central portion of the blanket 22. It should be understood, in the current embodiment, each of said blanket 22, the inner frame 22A, and the padding 28 include four perimeter sides but may be made to include more or less perimeter sides.

In one embodiment the inner frame 22 may serve as a mounting point for a mounting assembly 40. The mounting assembly 40 may include at least one mounting loop 46 mounted to the inner frame 22A. The inner frame 22A may include at least four corners. It may be suitable for the mounting loop 46 to be disposed about the at least four corners of the inner frame 22A. The mounting loops 46 may be made of a nylon or leather material. The mounting loops 46 may include a squared end that is mounted to the inner frame 22A via stitching. The stitching of the mounting loops 46 to the inner frame 22A provides an anchor point for articles 42 to be mounted thereon. In multiple embodiments the articles 42 may include various types of pet related toys. The pet related toys may include but are not limited to chew toys, dental toys, interactive toys, plush toys, or any variation thereof. Each of the mounting loops 46 on the inner frame 22A may receive an article 42 thereon. In one embodiment a total of four articles 42 may be mounted to the mounting loops 46. It may be suitable for the articles 42 to include an article loop 48. The article loop 48 may be a nylon or leather loop secured about an exterior of each article 42. The article loop 48 may be mounted to the mounting loops 46 via clips 44. The clips 44 may be a securing clasp that removably attaches the article loops 48 to the mounting loops 46. The clips 44 may be a carabiner, a snap button fastener, hook and loop fastener, or any variation thereof. The clips 44 may help facilitate removing the articles 42 from the blanket 22 should said articles 42 or said blanket 22 need to be washed in a washing machine.

Figure 2:
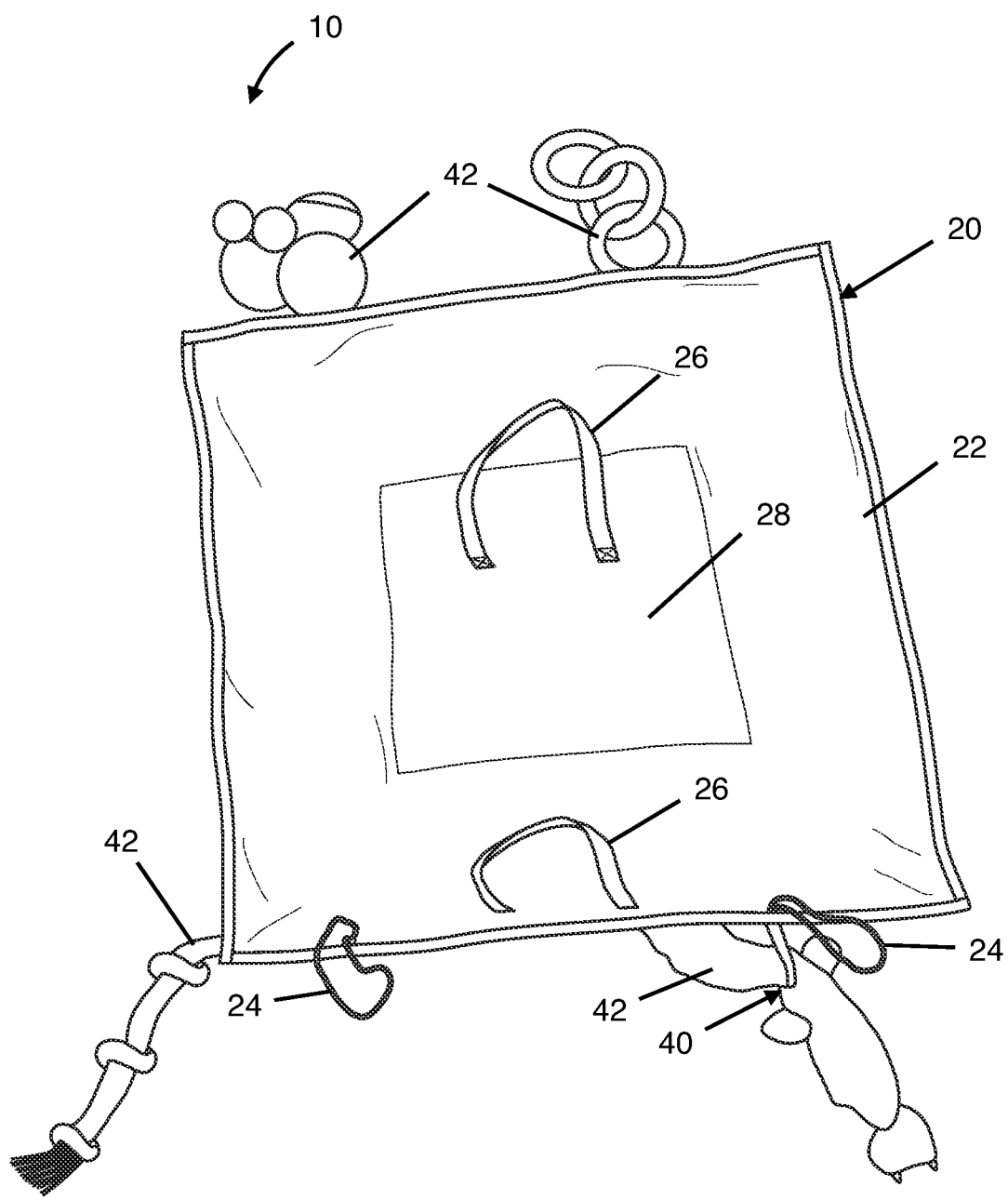
FIG. 2 shows a rear view of the blanket 22 including handles 26 mounted thereon. The bands 24 are mounted along a bottom edge of the blanket 22.
Figure 3:
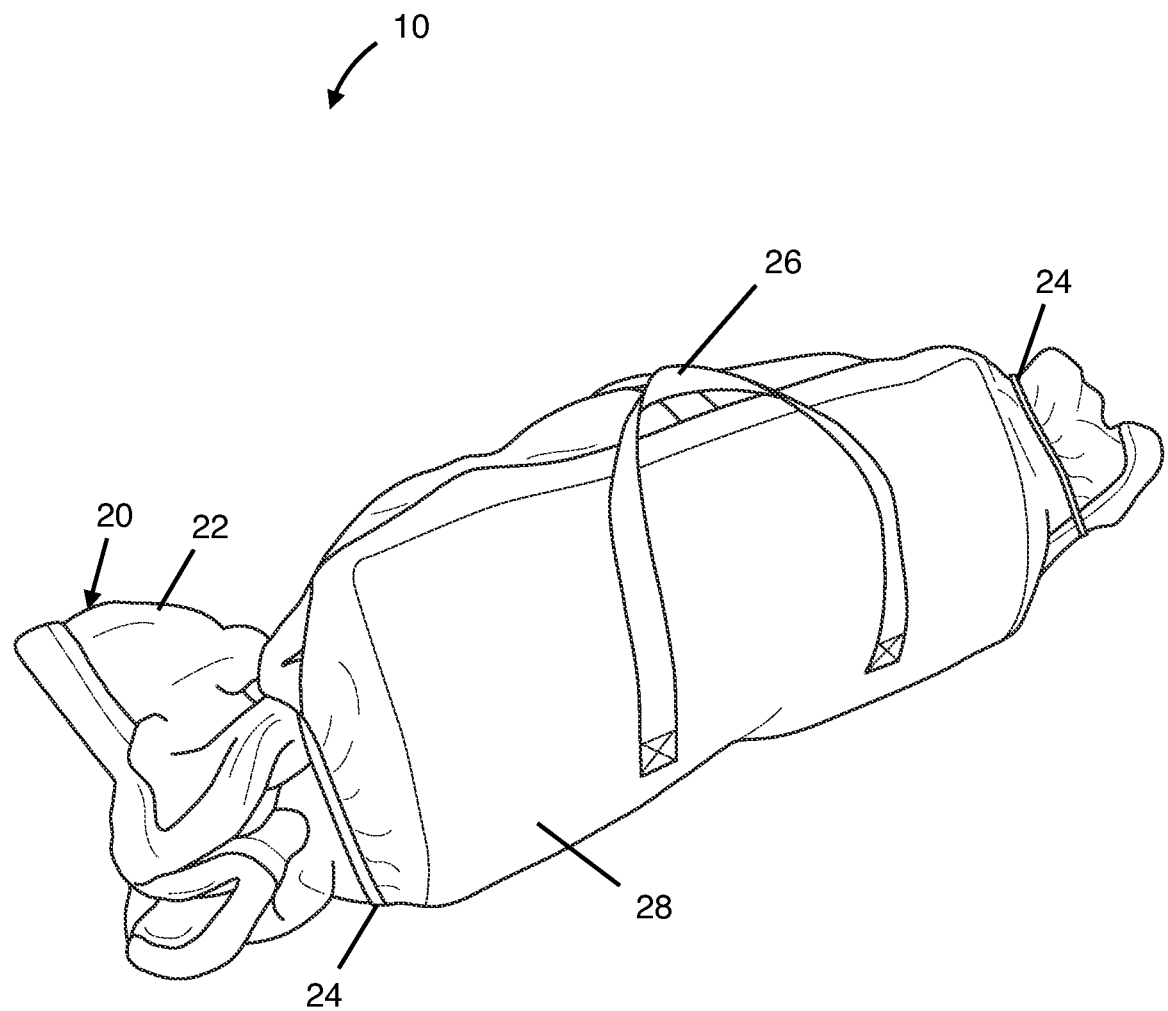
FIG. 3 illustrates the blanket 22 in a closed configuration. The blanket 22 is maintained in the closed configuration by bands 24 as it wraps around the exterior of said blanket 22. The close configuration features the handles 26 being exposed for user portability.

Best illustrated in FIGS. 2-3 the blanket 22 may further include handles 26 and bands 24. It may be suitable for the handles 26 to be mounted to a rear portion of the blanket 22. In one embodiment the handles 26 may be a strap made of a nylon material. Wherein the handles 26 are mounted about their strap ends via stitching to the blanket 22. The handles 26 may be mounted to the blanket 22 in a pair. Wherein one of the handles 26 from said pair is mounted to a central portion adjacent to the padding 28. Another handle 26 may be mounted to an interior of a blanket 22 bottom edge. Located about a rear bottom edge may be bands 24. The bands 24 may be elastic loops mounted in pairs to the rear portion of the blanket. It may be suitable for the bands 24 to be mounted in alignment with opposing opposite perimeter ends of the padding 28. The bands 24 may help maintain the blanket 22 in a closed configuration. When the blanket 22 is furled, the mounting loops 46 pull on the article loops 48 to help quickly organize the articles before the blanket is placed into a closed configuration. The bands 24 may then loop around the exterior of said blanket 22. Thereby preventing the blanket 22 from unfurling and allowing for the handles 26 to be exposed so the user may portably transport the present invention.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A system for a pet toy mat, comprising:
   a. a blanket assembly including a blanket, wherein said blanket includes a padding mounted to a blanket front face, said blanket including a rear face with bands to facilitate placing said blanket into a closed configuration, the bands being mounted to a rear bottom edge of the blanket, wherein said blanket includes four perimeter sides, said padding is entirely surrounded by an inner frame mounted to the front face of the blanket; and
   b. a mounting assembly including articles, and mounting loops, wherein said articles include article loops mounted thereon, each of the article loops being detachably mounted to the blanket via clips that engage with said mounting loops, wherein said mounting loops made of leather have a squared edge, said squared edge is attached to said blanket by means of stitches.

2. The system for a pet toy mat of claim 1 wherein said blanket includes multiple layers stitched together about an outer perimeter edge, wherein said padding is centrally embedded between the multiple layers of the blanket to provide structural stability to said blanket.

3. The system for a pet toy mat of claim 1 wherein said inner frame includes corners with the mounting loops respectively mounted thereon, said mounting loops are straps forming a loop, wherein said loop is stitched onto said inner frame.

4. The system for a pet toy mat of claim 1 wherein said bands are made of an elastic material.

5. The system for a pet toy mat of claim 1 wherein said bands include two bands mounted in pairs to a rear portion of said blanket and proximal to an edge where a handle of said handles is mounted.

6. The system for a pet toy mat of claim 1 wherein said at least one handle includes two handles.

7. A system for a pet toy mat, comprising:
   a. a blanket assembly including a blanket, wherein said blanket includes multiple layers stitched together about an outer perimeter edge, the blanket including a padding centrally embedded between the multiple layers of the blanket, the padding being entirely surrounded by an inner frame mounted to a blanket front face, said blanket further including a rear face with handles and bands to facilitate placing said blanket into a closed configuration, the bands being mounted to a rear bottom edge of the blanket, said handles are straps made of nylon, wherein said blanket includes four perimeter sides; and
   b. a mounting assembly including articles, and mounting loops, wherein said articles include article loops mounted thereon, each of the article loops being detachably mounted to the blanket via clips that engage with said mounting loops, wherein said mounting loops made of leather have a squared edge, said squared edge is attached to said blanket by means of stitches, said articles include pet related toys such as, chew toys, dental toys, interactive toys, and or plush toys, said inner frame includes corners with the mounting loops respectively mounted thereon, said mounting loops are straps forming a loop, wherein said loop is stitched onto said inner frame.

8. The system for a pet toy mat, consisting of:
   a. a blanket assembly including a blanket, wherein said blanket includes multiple layers stitched together about an outer perimeter edge, the blanket including a padding centrally embedded between the multiple layers of the blanket, the padding being entirely surrounded by an inner frame mounted to a blanket front face, said blanket further including a rear face with handles and bands to facilitate placing said blanket into a closed configuration, the bands being mounted to a rear bottom edge of the blanket, wherein said blanket includes four perimeter sides, said bands are made of an elastic material, wherein said bands include two bands mounted in pairs to a rear portion of said blanket; and
   b. a mounting assembly including articles, and mounting loops, wherein said articles include article loops mounted thereon, each of the article loops being detachably mounted to the blanket via clips that engage with said mounting loops, wherein said mounting loops made of leather have a squared edge, said squared edge is attached to said blanket by means of stitches, said articles include pet related toys such as, chew toys, dental toys, interactive toys, and or plush toys, said inner frame includes corners with the mounting loops respectively mounted thereon, said mounting loops are straps forming a loop, wherein said loop is stitched onto said inner frame.

* * * * *